C., T. F. & J. W. Weston,
Dressing Leather,
No. 839. Reissued Oct. 18, 1859.
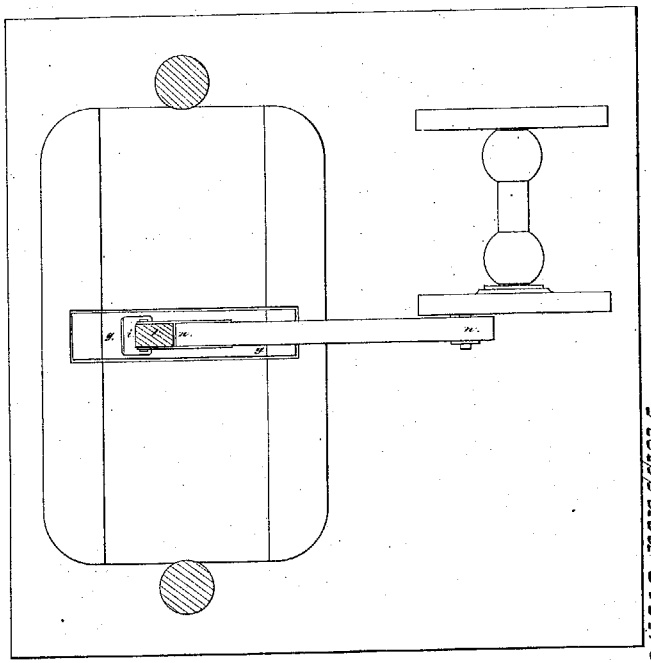
Fig. 2.
Fig. 3.
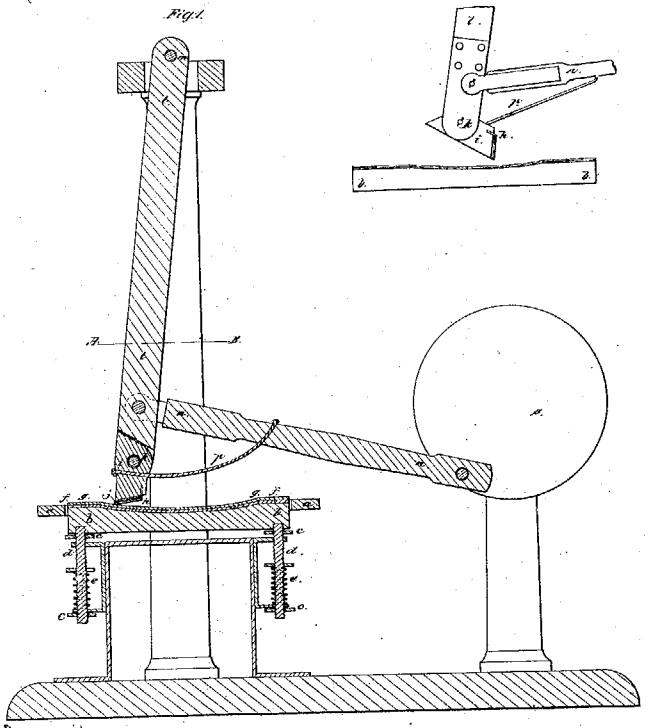
Fig. 1.
Witnesses:
Eben Lincoln
W. Myers
Inventors:
Chas Weston
C. F. Weston
John T. Weston
N. PETERS, PHOTO-LITHOGRAPHER, WASHINGTON, D. C.

UNITED STATES PATENT OFFICE.

C. WESTON, T. F. WESTON, AND JOHN W. WESTON, OF SALEM, MASSACHUSETTS.

IMPROVEMENT IN LEATHR-FINISHING MACHINES.

Specification forming part of Letters Patent No. 13,605, dated September 25, 1855; Reissue No. 839, dated October 18, 1859.

*To all whom it may concern:*

Be it known that we, CHARLES WESTON, T. F. WESTON, and JOHN W. WESTON, all of Salem, in the county of Essex and State of Massachusetts, have invented a certain new and useful Machine for Finishing Leather; and we do hereby declare that the following description, taken in connection with the accompanying drawings, hereinafter referred to, forms a full and exact specification of the same, wherein we have set forth the nature and principles of our improvements by which our invention may be distinguished from all others of a similar class, together with such parts as we claim and desire to have secured to us by Letters Patent.

The figures of the accompanying plate of drawings represent our improvements. Figure 1 is a central vertical section of the machine. Fig. 2 is a horizontal section of the same, taken in the plane of the line A B, Fig. 1. Fig. 3 is a detail view, to be hereinafter referred.

Our improved machine for finishing leather is similar in its general features to the machine used for polishing leather. In polishing leather, a smooth, blunt tool, made of glass or other hard substance, is attached to a swinging arm or pendulum, and made to rub across the leather placed upon a hard bed. The effect aimed at in finishing heavy upper leather by hand is to make the leather soft and pliable, the reverse of what would result from using the machines for polishing leather in finishing upper leather or wax leather. By the present invention, leather is finished as well as by hand labor, and very much faster.

In our machine a soft elastic bed is used, composed of a layer of leather over one of rubber, it having been found by practical experiments that if rubber alone were used it would soon wear out by the friction of the tool upon it, and thereby defeat the purpose aimed at. During a portion of the operation of finishing leather, called "setting out," it is in a wet state, and would become hard by the rubbing of a hard, unyielding tool—like the tool used in polishing leather—upon it in the same manner as sole-leather becomes hard by being hammered while wet. To obviate this difficulty, we use an elastic tool made of thin steel, bent at an angle with the bed, having rubber inserted between the steel and stock of the tool. As the tool thus constructed is quite sharp, it would be liable to make an indentation in the leather if it struck the same in traveling back over the bed, and to prevent this a cord is attached at one end to the stock of the tool and at the other end to the connecting-rod, by which motion is communicated to the arm that carries the tool.

Having thus stated the general features of our machine and the points of distinction between it and the machine for polishing leather, we shall now proceed to describe in detail its construction.

*a a a* in the drawings represent a table or platform, on which the leather to be finished is placed. *b b* is the bed, made adjustable by the nuts, *c c*, &c., working on the screws *d d'*. A spiral spring, *e*, coiled around each of the screws as shown in Fig. 1, renders the bed elastic and permits it to yield a little. On the top of the bed *b b* is first secured a layer of rubber, *f*, and over that one of leather, *g*, thereby forming a soft and elastic bed. The finishing-tool consists of a bent piece of steel, *h*, inserted in the stock *i*. Between the tool *h* and the bottom of the tool-stock is placed a piece of rubber, *j*. The tool-stock *i* turns upon a pivot, *k*, in the arm or pendulum *l l*, which turns upon a center at *m*. The arm *l l* receives a traversing motion across the bed *b b*, describing an arc of a circle, to which arc the bed *b b* conforms, by means of a connecting-rod, *n n*, attached to a revolving wheel, *o*.

The leather to be finished is placed upon the bed *b b*, and the elastic tool *h* as it rubs across the leather, sustained by the soft elastic bed, produces the same effect upon the leather as does the finishing process by hand, rendering the leather soft and pliable. As the tool acts upon the leather only in its forward motion, it is prevented from striking against the leather while traveling back, which would produce marks or cuts in the same, by means of a cord, *p*, one end of which passes through the tool-stock, while the other end is attached to the connecting-rod *n n*. The tool-stock will thus be held up during its retrograde movement sufficient to clear the leather upon the bed, as shown in Fig. 3. It will be seen that the tool will be brought to bear upon the bed as soon as it commences its forward and rubbing motion and lifted from the same as soon as it commences its backward motion by its own momentum and by the change of the angle between the pendulous bar *l l* and the connecting-rod *n n*, the cord *p* serving to hold the tool up after it has been lifted and prevent its striking upon the leather during its backward motion.

Having thus described our invention, what we claim as our invention, and desire to have secured to us by Letters Patent, is—

1. In machines for finishing leather, the employment of a soft, elastic bed, substantially as described.

2. The combination of an elastic bed and tool, both constructed and operating together to produce the desired effect upon the leather, as set forth.

3. In combination with the soft elastic bed and elastic finishing-tool, the cord *p*, secured to the tool-stock for the purpose of keeping the tool clear of the leather during its retrograde movement over the bed, as hereinabove set forth.

C. WESTON.
T. F. WESTON.
JOHN W. WESTON.

Witnesses:
OLIVER PEABODY,
C. H. WESTON.